United States Patent
Wang

(10) Patent No.: US 7,817,516 B2
(45) Date of Patent: Oct. 19, 2010

(54) DETECTION METHOD FOR TILT OF OPTICAL PICKUP HEAD

(75) Inventor: Chun-Chieh Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 440 days.

(21) Appl. No.: 11/946,855

(22) Filed: Nov. 29, 2007

(65) Prior Publication Data

US 2008/0295124 A1    Nov. 27, 2008

(30) Foreign Application Priority Data

May 24, 2007    (CN) .................... 2007 1 0200698

(51) Int. Cl.
*G11B 7/00* (2006.01)
(52) U.S. Cl. ................. 369/53.19; 369/53.4; 369/44.32
(58) Field of Classification Search ............. 369/53.19, 369/44.32, 53.1, 53.12, 53.13, 53.14, 53.41, 369/53.4, 53.42, 53.3
See application file for complete search history.

(56) References Cited

U.S. PATENT DOCUMENTS

| | | | | |
|---|---|---|---|---|
| 4,608,680 A | * | 8/1986 | Yano | 369/44.32 |
| 4,780,865 A | * | 10/1988 | Yamakawa | 369/44.32 |
| 5,216,649 A | * | 6/1993 | Koike et al. | 369/44.23 |
| 5,430,699 A | * | 7/1995 | Matsubara et al. | 369/44.32 |
| 5,483,512 A | * | 1/1996 | Yanagawa | 369/53.19 |
| 5,546,367 A | * | 8/1996 | Yoshimura et al. | 369/44.32 |
| 5,596,557 A | | 1/1997 | Matsumoto | |
| 5,719,847 A | * | 2/1998 | Tateishi et al. | 369/53.19 |
| 6,167,008 A | | 12/2000 | Kuribayashi | |
| 6,259,665 B1 | * | 7/2001 | Nagasato | 369/53.19 |
| 2004/0057352 A1 | | 3/2004 | Kim et al. | |
| 2005/0117473 A1 | * | 6/2005 | Ke et al. | 369/44.32 |
| 2008/0304386 A1 | * | 12/2008 | Wang | 369/53.19 |

* cited by examiner

*Primary Examiner*—Tan X Dinh
(74) *Attorney, Agent, or Firm*—Frank R. Niranjan

(57) ABSTRACT

A method is used for detecting a tilt of an optical pickup head. The method includes the steps of: capturing a plurality of images; converting the images to bitmap images; superposing the bitmap images together to form an superimposed bitmap image; setting a two-dimensional coordinating system of the superimposed bitmap image; determining coordinates of a first static spot, a second static spot, and dynamic spot; calculating a first distance between the first static spot and the dynamic spot, and a second distance between the second static spot and the dynamic spot based on the coordinates to determine a maximum distance; and comparing the maximum distance with a first standard distance to attain a conclusion whether the tilt is in an acceptable range.

15 Claims, 11 Drawing Sheets

FIG. 4

DETECTION METHOD FOR TILT OF OPTICAL PICKUP HEAD

BACKGROUND

1. Field of the Invention

The present invention generally relates to a method for detecting tilt of an optical pickup head.

2. Description of Related Art

In recent years, optical disk recording and/or reproducing devices have been widely used as portable storing and reproducing electronic consuming devices in our daily life. Each optical disk recording and/or reproducing device mainly includes an optical pickup head for emitting a light beam, a guiding apparatus for movably supporting the optical pickup head, and a driving mechanic for driving the optical pickup head to move.

Referring to FIG. 8, an optical disk recording and/or reproducing device 10 is used for recording data to and/or reproducing data from an optical disk 150. In the optical disk recording and/or reproducing device 10, an optical pickup head 120 is movably supported in two guiding poles 106, and a stepping motor 108 is used for moving the optical pickup head 120 along the guiding poles 106. When the guiding poles 106 are not parallel to each other, a tilt occurs. If the guiding poles 106 are parallel to each other, but the virtual plane defined by the guiding poles 106 is not parallel to the turntable 104, the tilt is also generated. When the optical pickup head 120 is tilted, light from the optical pickup head 120 cannot be vertically projected to the optical disk 150. The tilt of the optical pickup head 120 is a main factor influencing recording and reproducing capability of the optical disk recording and/or reproducing device 10.

Therefore, it is important to detect the tilt of the optical pickup head 120. Referring to FIGS. 9, 10, a conventional method is used to detect the tilt using a collimator 200 and three reflecting planes 132, 134, 136. The reflecting planes 132, 134, 136 are set on the turntable 104, and two ends of the guiding poles 106 respectively. In operation, the collimator 200 emits light beams, and the light beams are projected to the reflecting planes 132, 134, 136 and reflected therefrom. The reflected light beam are received and analyzed by the collimator 200, and information carried in the reflected light beams is displayed on a display screen (not shown). Referring also to FIG. 11, three light spots 42, 44, 46 are displayed in an image 40. Herein, the light spots 42, 44 are formed by the light beams reflected from the reflecting planes 134, 136, which are defined as static spots. The light spot 46 is formed by the light beam reflected from the reflecting plane 132, which is defined as dynamic spot.

If the static spots 42, 44 are both laid on center of the dynamic spot 46, it is determined that no tilt is generated. If one of the static spots departs from the center of the dynamic spot 46, a first distance between the center of the departure static spot and the center of the dynamic spot represents a first unparallel degree of the guiding poles 106 to the turntable 104, and a second distance between the center of the static spot 42 and the center of the static spot 44 represents a second unparallel degree of the guiding poles 106. If the static spots both depart from the center of the dynamic spot 46, a bigger distance between the center of the dynamic spot 46 and the centers of the static spots 42, 44 represents the first unparallel degree. Herein, the center means a geometric center of a minimum virtual rectangle that can enclose a spot.

In practice, the first and the second distances are measured manually to determine the tilt. Therefore, the conventional method includes some deficiencies, such as man-made determination error and low work efficiency.

Therefore, improvements for a tilt detecting method are needed in the industry to address the aforementioned deficiency.

SUMMARY

A tilt detecting method is used for detecting a tilt of an optical pickup head. The tilt detecting method includes the steps of: capturing a plurality of images; converting the images to bitmap images; superposing the bitmap images together to form an superimposed bitmap image; setting a two-dimensional coordinating system of the superimposed bitmap image; determining coordinates of a first static spot, a second static spot, and dynamic spot; calculating a first distance between the first static spot and the dynamic spot, and a second distance between the second static spot and the dynamic spot based on the coordinates to determine a maximum distance; and comparing the maximum distance with a first predetermined standard distance to attain a conclusion whether the tilt is in an acceptable range.

Other advantages and novel features of the present invention will become more apparent from the following detailed description of preferred embodiment when taken in conjunction with the accompanying drawings, in which:

BRIEF DESCRIPTION OF THE DRAWINGS

FIG. 4 is a schematic diagram showing a concrete structure of a bitmap image of static spots and a dynamic spot;

DETAILED DESCRIPTION OF THE EMBODIMENTS

Reference will now be made to the drawings to describe a preferred embodiment of the present tilt detecting method.

Figure 1:
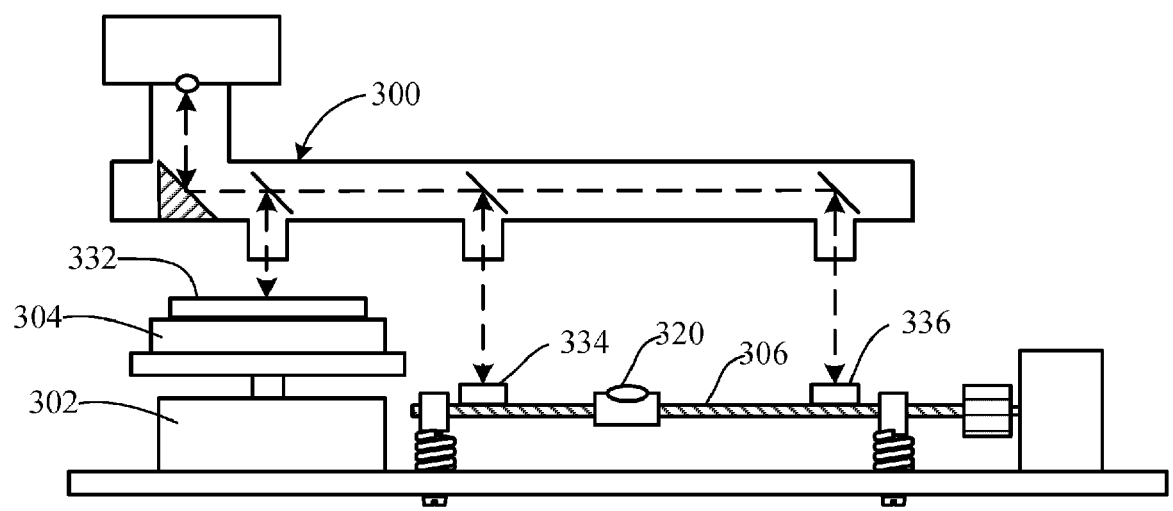
FIG. 1 is schematic diagram showing a collimator and the three reflecting planes used for detecting tilt of an optical disk recording and/or reproducing device in accordance with an exemplary embodiment.

Referring to FIG. 1, a collimator 300 and three reflecting planes 332, 334, 336 are used to detect the tilt of an optical pickup head 320 using a tilt detecting method in accordance with an exemplary embodiment. The reflecting planes 332, 334, 336 are set on a turntable 304, and two ends of a guiding pole 306 correspondingly. When operating, the collimator 300 emits light beams; the light beams are projected to the reflecting planes 332, 334, 336 and reflected back. Reflected light beams are received and analyzed by the collimator 300, and information corresponding to the reflected light beams is displayed on a display screen (not shown).

Figure 2:
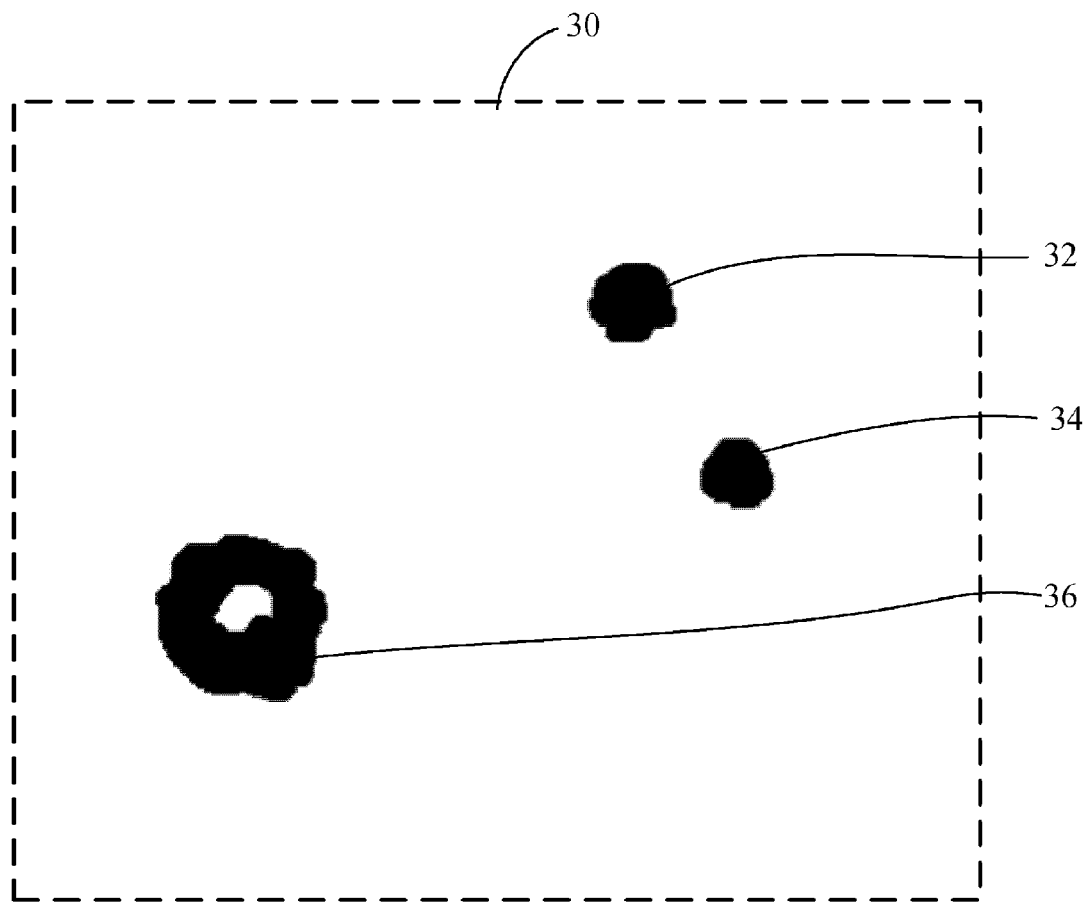
FIG. 2 is schematic diagram showing three light spots displayed in a image formed by three reflected light beams from the reflecting planes.

Referring also to FIG. 2, three light spots 32, 34, 36 are displayed in an image 30. Herein, the light spots 32, 34 formed by the reflected light beams from the reflecting planes 334, 336, are defined as static spots. The light spot 36 is formed by the light beam reflected from the reflecting plane 332, which is defined as dynamic spot.

Figure 3:
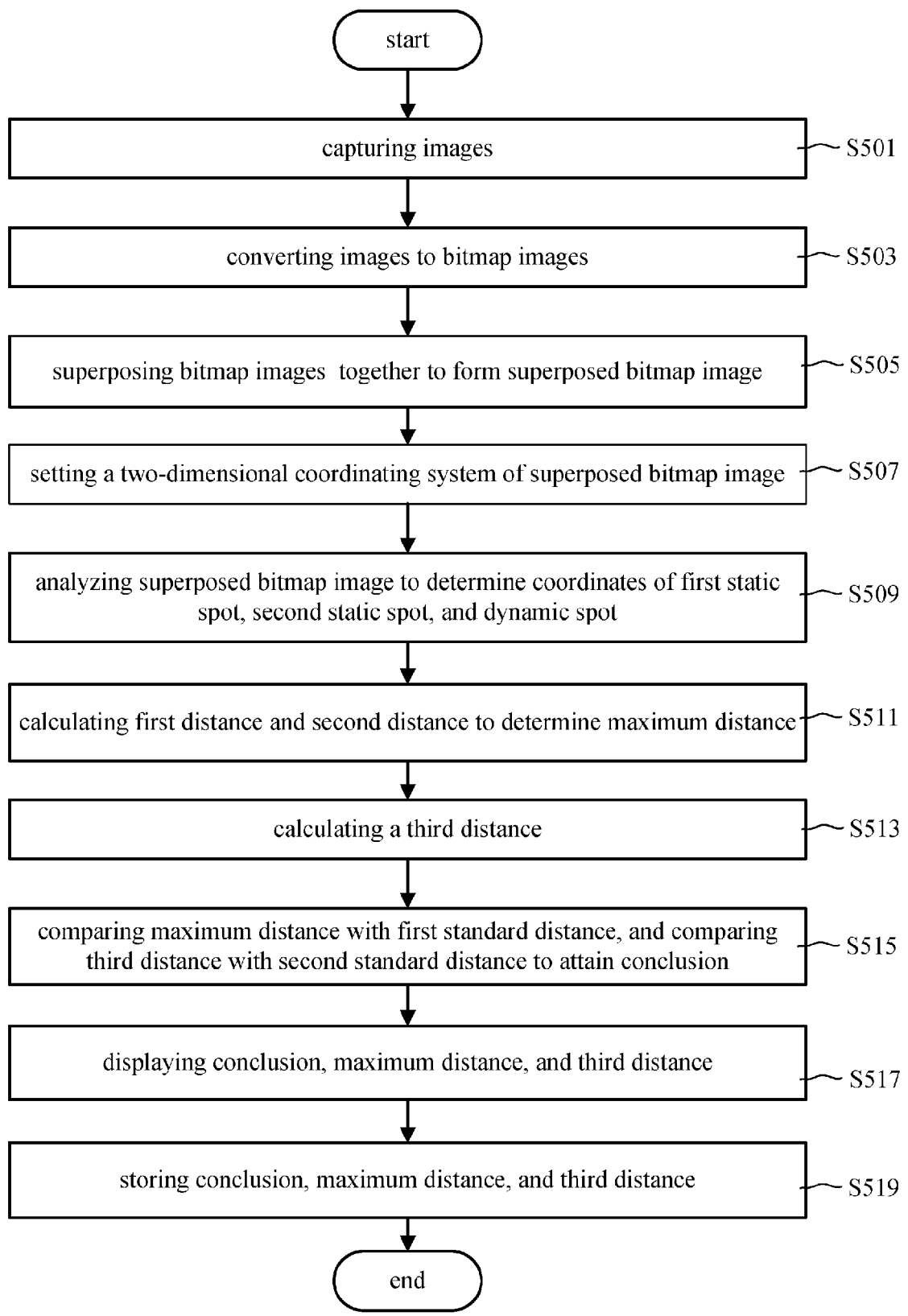
FIG. 3 is a process flow diagram showing a tilt detecting method in accordance with an exemplary embodiment.

Referring to FIG. 3, a flow chart showing a detecting procedure of the tilt detecting method for detecting tilt of the optical pickup head 120 is illustrated. The detecting procedure includes the following steps.

Step S501, the collimator 300 captures several images including the static spots and the dynamic spots under the same conditions. That is, the images are taken from the collimator 300 with a same focus and at a same capture angle. Moreover, other photoelectricity apparatus can also be used to capture the images. For exemplary purposes, in the preferred embodiment, the amount of the images is 3. However, the number of the images can be any other value that is not less than 3.

Figure 4:
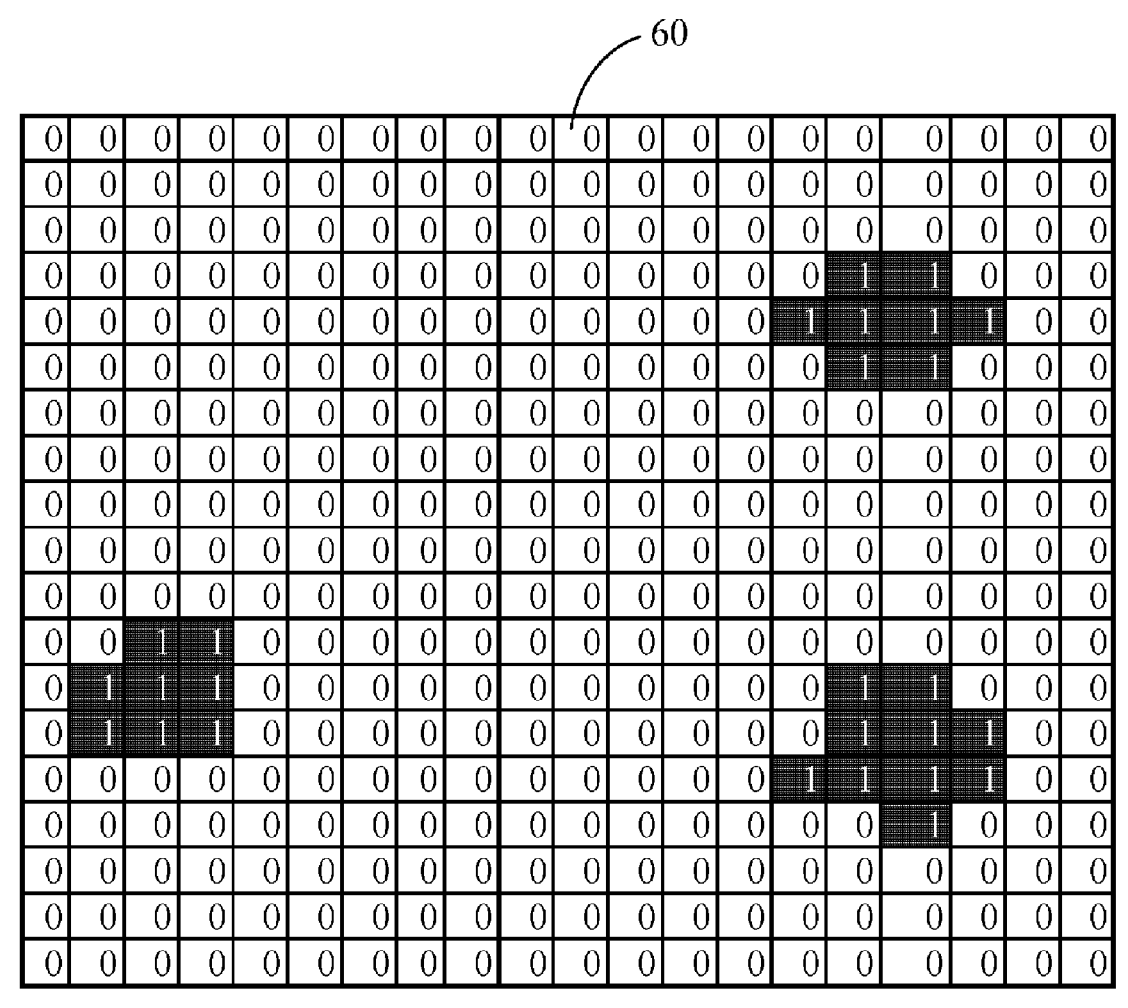

Step S503, the images are converted to bitmap images composed of pixels. Each of the pixels is represented by a pixel value. Referring to FIG. 4, for exemplary purposes, each of the pixels corresponding to the static spots and the dynamic spots has a pixel value of "1", representing a dark color such as black, and the pixels outside the spots each has a pixel value of "0", representing bright color such as white.

Figure 5:
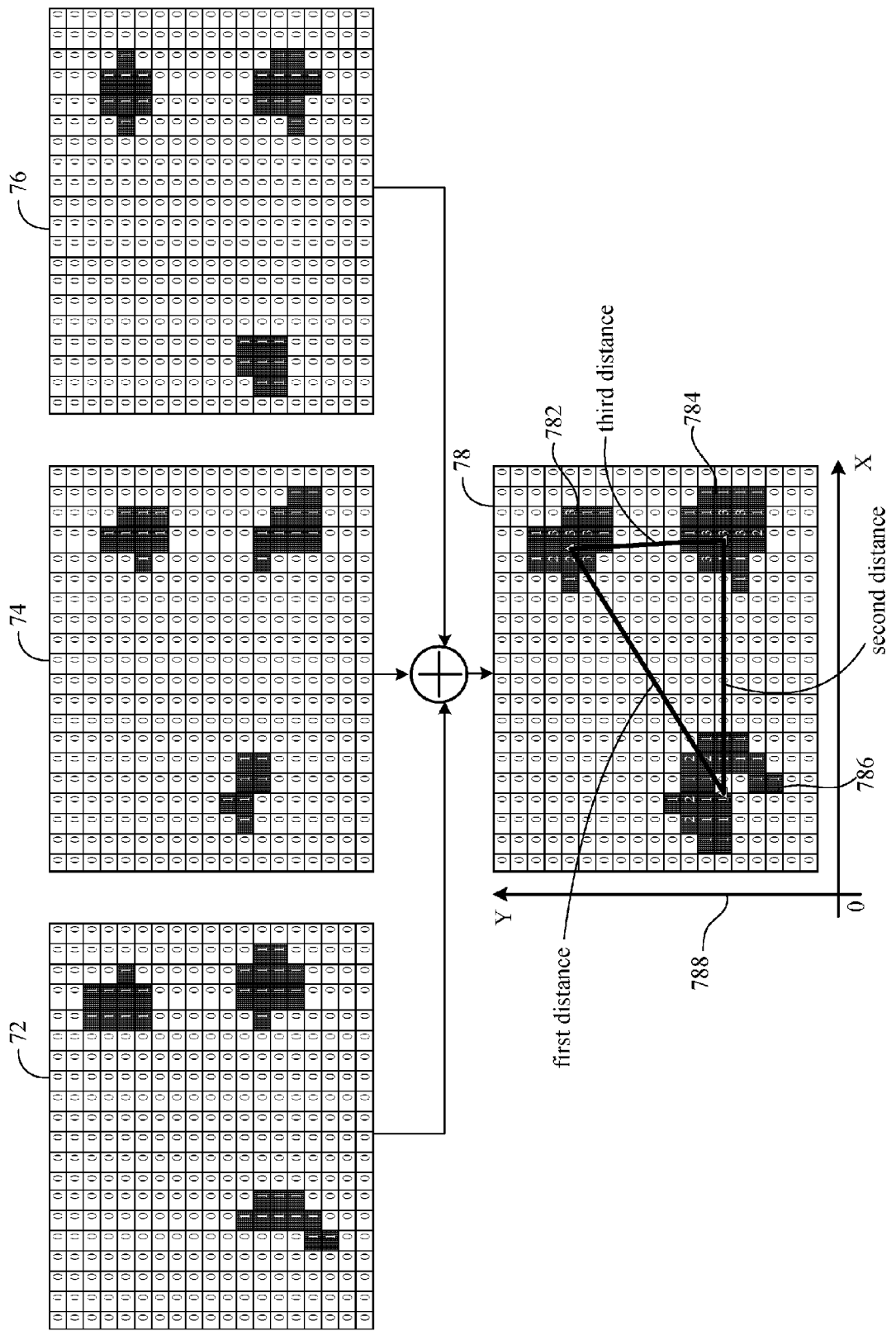
FIG. 5 is schematic diagram showing an superimposed bitmap image generated by superposing three bitmap images, and a two-dimensional coordinate system of the superimposed bitmap image.

Step S505, the bitmap images are superimposed together correspondingly to form a superimposed bitmap image. When the bitmap images are superimposed together, the pixel values are correspondingly added up to derive pixel values of bitmap data of the superimposed image. Referring to FIG. 5, a superimposed bitmap image 78 is generated by superimposing three bitmap images 72, 74, 76 together. There are three spots 782, 784, 786 in the superimposed bitmap image 78. The pixel values of the bitmap image 78 vary from a minimum value of "0" to a maximum value of "3". Since a distribution of the max value of the spots 782, 784 is relatively high, the spots are defined as concentrated spots. For example, the static spot 782 has two pixel values of "2" and five pixel values of "3", and the static spot 784 has one pixel value of "2" and six pixel values of "3". Thus, the static spots 782, 784 are concentrated. The spot 786 is a dynamic spot, which has comparative more small pixel values, such as seventeen pixel values of "1", and large overlaid area. This means that the dynamic spot 786 is dispersed.

Step S507, a two-dimensional coordinate system 788 is set on the superimposed bitmap image 78. Referring to FIG. 5, an X-axis of the two-dimensional coordinate system 788 is under the lower side of the superimposed bitmap image 78, and a Y-axis of the two-dimensional coordinate system 788 is near the left side of the superimposed bitmap image 78.

Step S509, the superimposed bitmap image 78 is analyzed. Coordinates of the static spots 782, 784 and the dynamic spot 786 are derived from the two-dimensional coordinate system 788.

Step S511, a first distance between the static spot 782 and the dynamic spot 786, and a second distance between the static spot 784 and the dynamic spot 786 are calculated. A maximum distance of the first distance and the second distance is determined.

Step S513, a third distance between the static spot 782 and the static spot 784 is calculated.

Step S515, the maximum distance is compared with a first predetermined standard distance, and the third distance is compared with a second predetermined standard distance, in order to obtain a result that shows whether the tilt is in an acceptable range. If the maximum distance is greater than the first predetermined standard distance or the third distance is greater than the second predetermined standard distance, the tilt is beyond the acceptable range. If the maximum distance is not greater than the first predetermined standard distance and the third distance is not greater than the second predetermined standard distance, the tilt is in the acceptable range.

Step S517, a result summary is displayed. The detecting result includes the conclusion, the maximum distance and the third distance.

Step S519, the detecting result is stored.

Figure 6:
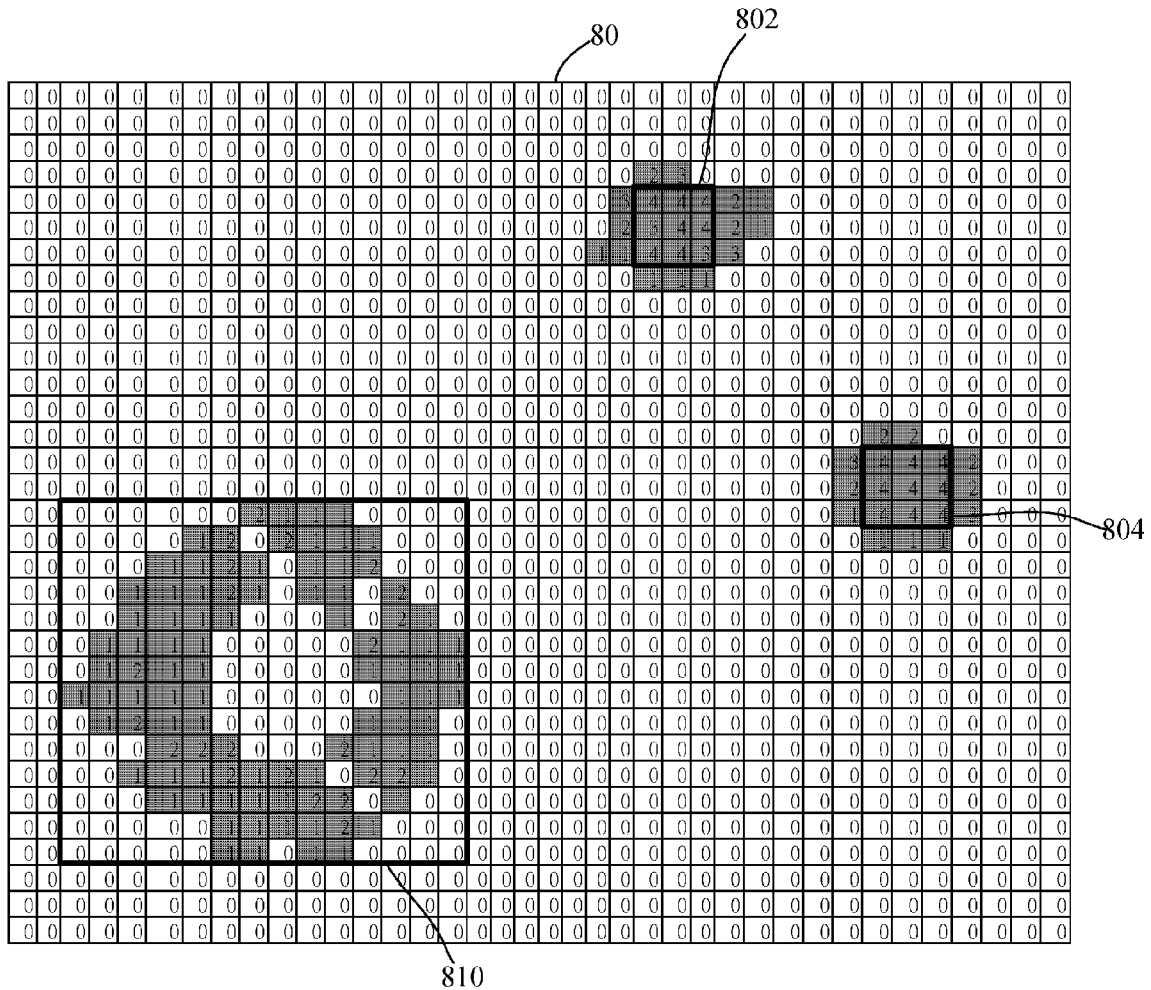
FIG. 6 is schematic diagram showing an superimposed bitmap image generated by superposing four bitmap images.
Figure 7:
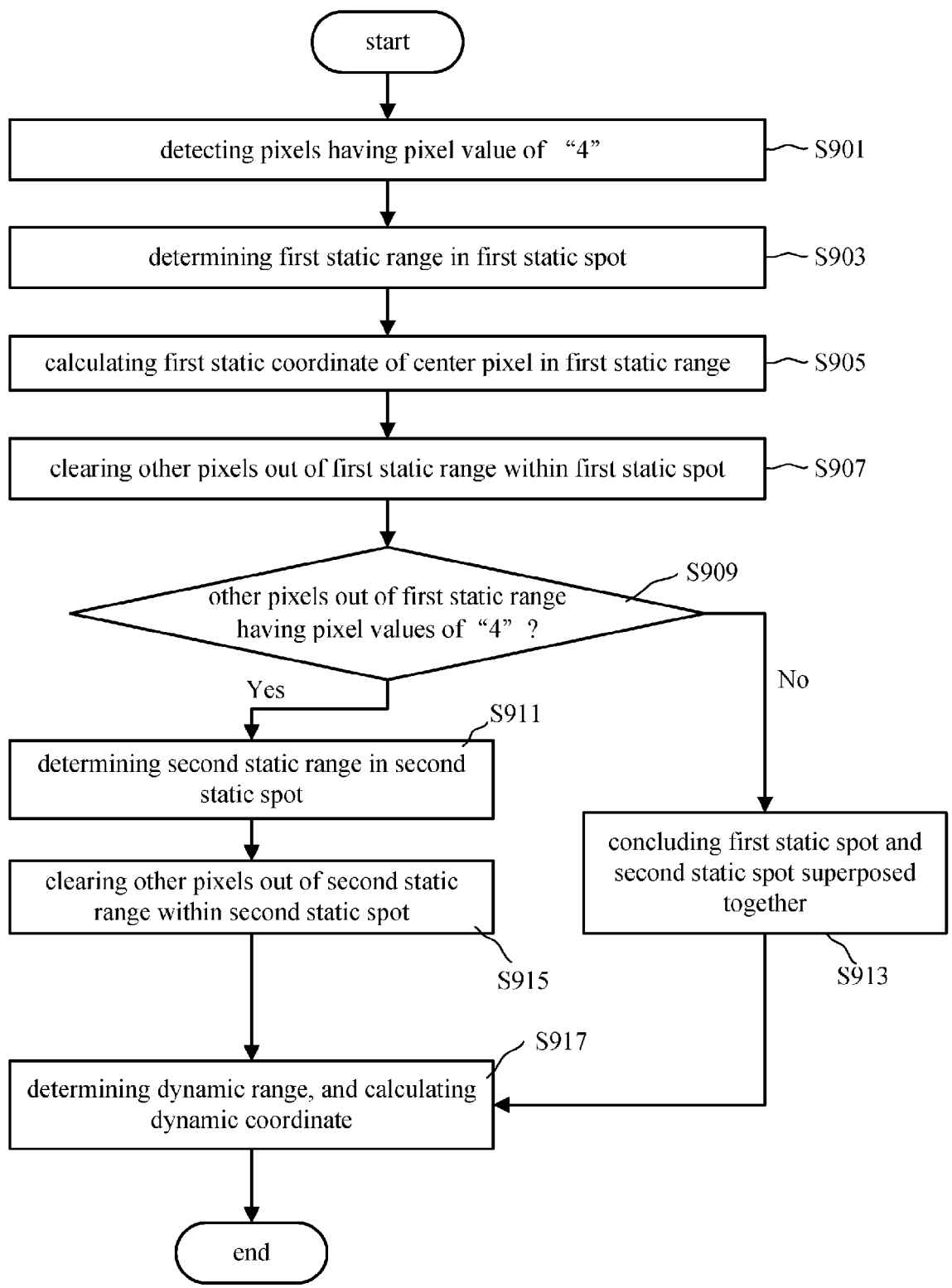
FIG. 7 is a process flow diagram showing a analyzing procedure for analyzing the superimposed bitmap image of FIG. 4.
Figure 8:
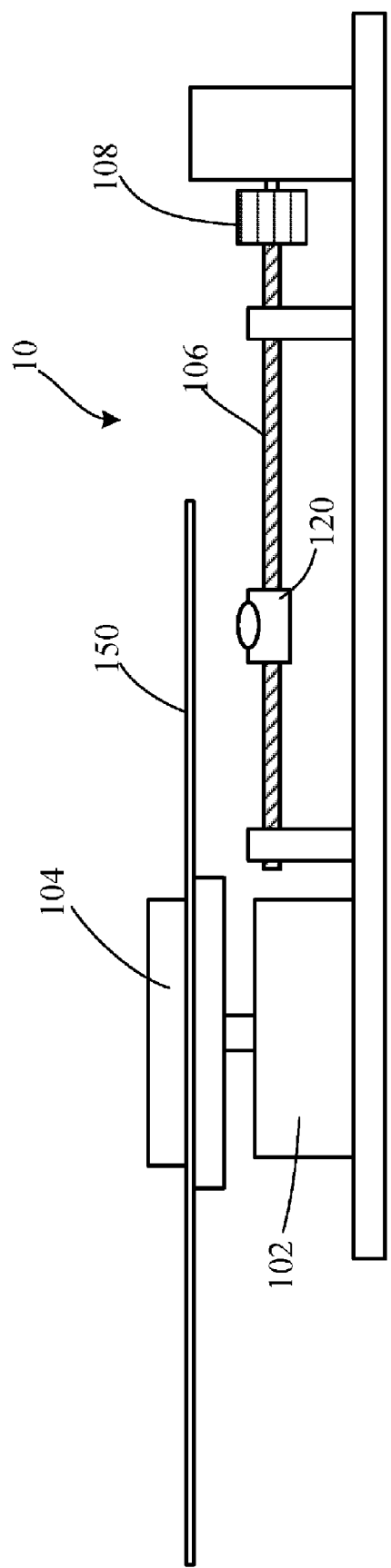
FIG. 8 is schematic diagram showing an optical disk recording and/or reproducing device.
Figure 9:
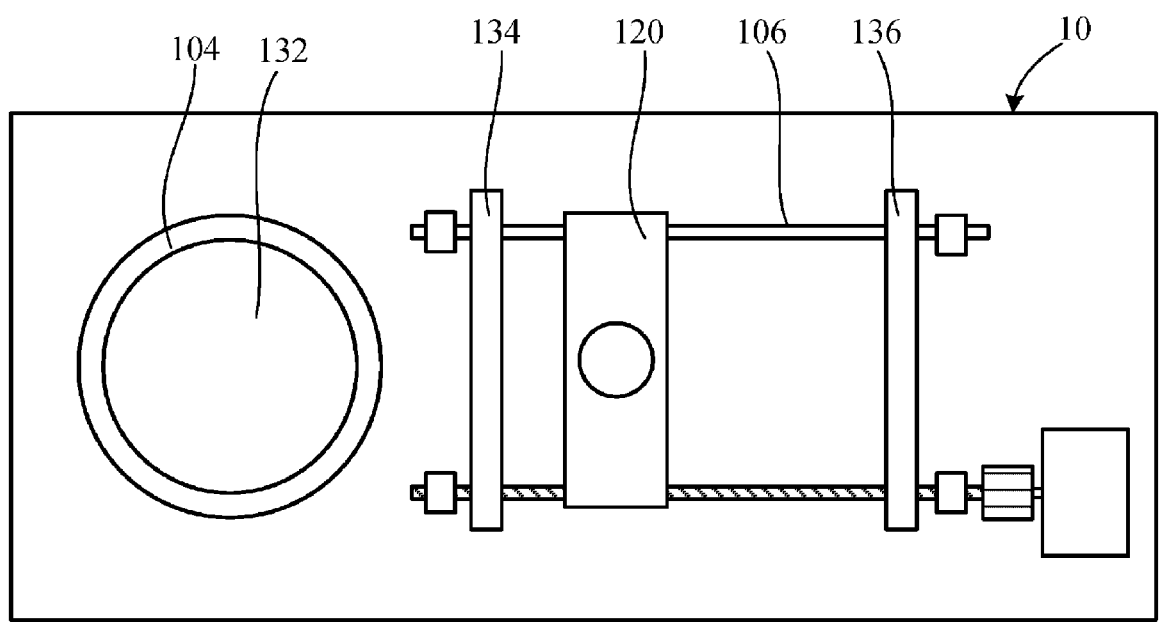
FIG. 9 is schematic diagram showing a conventional collimator and three reflecting planes used for detecting tilt of the optical disk recording and/or reproducing device of FIG. 8, viewed from an up aspect.
Figure 10:
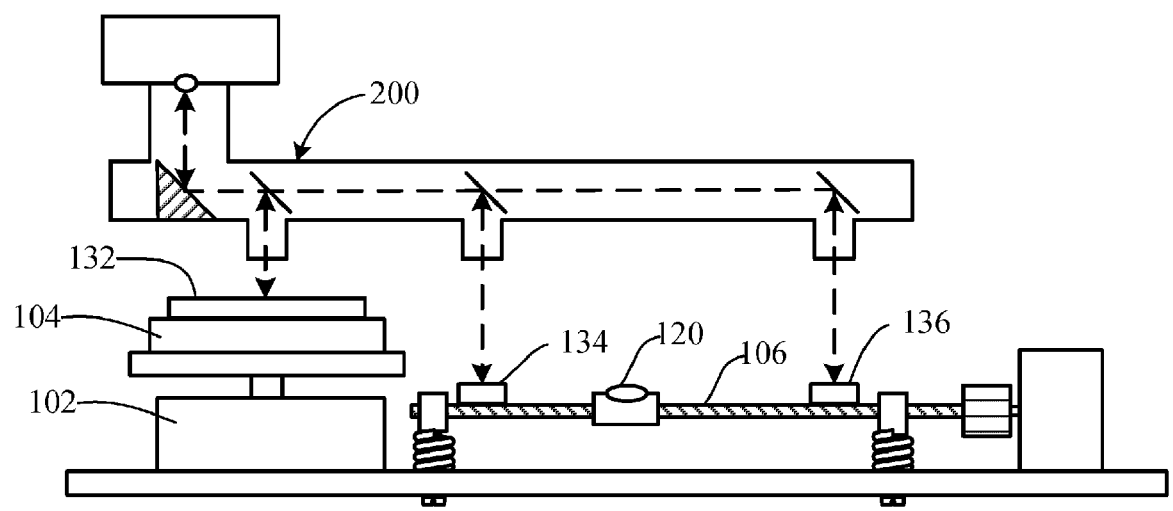
FIG. 10 is schematic diagram showing the collimator and the three reflecting planes used for detecting tilt of the optical disk recording and/or reproducing device of FIG. 8, viewed from a side aspect.
Figure 11:
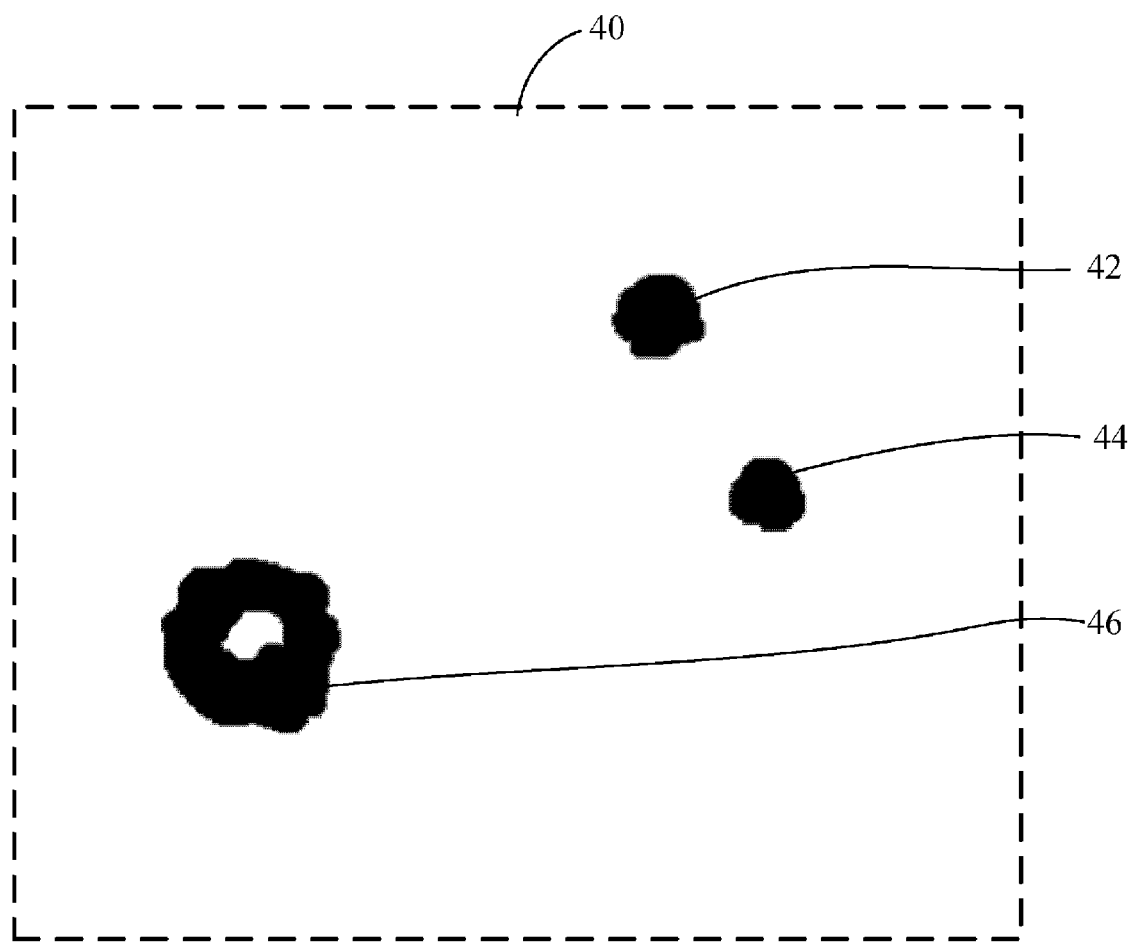
FIG. 11 is schematic diagram showing three light spots displayed in a image formed by three reflected light beams from the reflecting planes of FIG. 9.

Referring also to FIGS. 6, 7, an superimposed bitmap image 80 generated by superposing four bitmap images is taken for example to depict how to analyze the superimposed bitmap image 80 in the step S509 mentioned above. The analyzing procedure includes the following steps.

Step S901, pixels having pixel value of "4" are detected in the superimposed bitmap image 80. Herein, a pixel having pixel value of "4" means static spots or dynamic spots of the four bitmap images are overlaid on the same pixel.

Step S903, a first static range 802 is determined by collecting all pixels with pixel values of "4" together in a first static spot (not labeled). The first static range 802 must be a square.

Step S905, a center pixel of the first static range 802 is determined, and a first static coordinate of the center pixel is calculated.

Step S907, the other pixels out of the first static range 802 within the first static spot are cleared.

Step S909, the superimposed bitmap image 80 is detected to determine whether other pixels out of the first static range 80 have pixel value of "4".

Step S911, if the other pixels have pixel value of "4", a second static range 804 is determined by collecting all pixels with pixel value of "4" together in a second static spot (not labeled), and a second static coordinate of a center pixel of the second static range 804 is calculated, and the analyzing procedure goes to step S915.

Step S913, if no pixels out of the first static range 80 have pixel value of "4", it is concluded that a first static spot and the second static spot are superposed together, and a second static coordinate is equal to the first static coordinate, and the analyzing procedure goes to step S917.

Step S915, the other pixels out of the second static range 804 within the second static spot are cleared.

Step S917, the superimposed bitmap image 80 is detected to determine a dynamic range 810 which is a rectangle containing pixels having values "1", "2", "3" out of the first static range 802 and the second static range 804. A dynamic coordinate of a center pixel of the dynamic range 810 is calculated.

As mentioned above, the first static coordinate, the second static coordinate, and the dynamic coordinate are determined automatically using the tilt detecting method. Moreover, the conclusion whether the tilt is in an acceptable range is obtained automatically. Therefore, man-made determination error can be averted and work efficiency can be elevated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for detecting a tilt of an optical pickup head comprising:
    capturing a plurality of images of a first static spot, a second static spot, and a dynamic spot;
    converting the images to bitmap images;
    superposing the bitmap images together to form a superimposed bitmap image;
    setting a two-dimensional coordinating system of the superimposed bitmap image;
    determining coordinates of a first static spot, a second static spot, and a dynamic spot;
    calculating a first distance between the first static spot and the dynamic spot and a second distance between the second static spot and the dynamic spot based on the coordinates to determine a maximum distance; and
    comparing the maximum distance with a first predetermined standard distance to obtain a conclusion whether the tilt is in an acceptable range.

2. The method according to claim 1, further comprising:
    calculating a third distance between the first static spot and the second static spot based on the coordinates; and
    comparing the third distance with a second predetermined standard distance.

3. The method according to claim 1, further comprising:
    displaying the conclusion, the maximum distance, and the third distance.

4. The method according to claim 1, further comprising:
    storing the conclusion, the maximum distance, and the third distance.

5. The method according to claim 1, wherein the number of the images is represented as N and N is not less than three.

6. The method according to claim 5, further comprising:
    detecting pixels having pixel value of "N" in the superimposed bitmap image;
    determining a first static range by collecting all pixels with pixel value of "N" together in the first static spot;
    calculating a first static coordinate of a center pixel in the first static range;
    clearing other pixels out of the first static range within the first static spot;
    detecting the superimposed bitmap image to determine whether other pixels out of the first static range have pixel value of "N"; and
    concluding that the first static spot and the second static spot are superposed together, and a second static coordinate is equal to the first static coordinate if no pixels out of the first static range have pixel value of "N".

7. The method according to claim 6, further comprising:
    determining a second static range by collecting all pixels with pixel value of "N" together in the second static spot; and
    clearing other pixels out of the second static range within the second static spot.

8. The method according to claim 7, further comprising:
    determining a dynamic range having pixel values from "1" to "N-1" out of the first static range and the second static range.

9. The method according to claim 8, further comprising:
    calculating a dynamic coordinate of a center pixel of the dynamic range.

10. A method for detecting a tilt of an optical pickup head comprising:
    capturing a plurality of images of a first static spot, a second static spot, and a dynamic spot, wherein the number of the images is depicted as N;
    converting the images to bitmap images;
    superposing the bitmap images together to form a superimposed bitmap image;
    setting a two-dimensional coordinating system of the superimposed bitmap image;
    detecting pixels having pixel value of "N" in the superimposed bitmap image;
    determining a first static range by collecting all pixels with pixel value "N" together
    calculating a first static coordinate of a center pixel in the first static range;
    clearing other pixels out of the first static range within the first static spot;
    detecting the superimposed bitmap image to determine whether other pixels out of the first static range have pixel value of "N"; and
    determining the tilt is in an acceptable range if no pixels out of the first static range have pixel value of "N".

11. The method according to claim 10, further comprising:
    determining a second static range by collecting all pixels with pixel value of "N" together in the second static spot; and
    clearing other pixels out of the second static range within the second static spot.

12. The method according to claim 11, further comprising:
    determining a dynamic range having pixel values from "1" to "N-1" out of the first static range and the second static range; and
    calculating a dynamic coordinate of a center pixel of the dynamic range.

13. The method according to claim 12, further comprising:
    calculating a first distance between the first static spot and the dynamic spot, and a second distance between the second static spot and the dynamic spot based on the first static coordinate, the second static coordinate, and the dynamic coordinate, to determine a maximum distance; and
    comparing the maximum distance with a first predetermined standard distance to attain a conclusion whether the tilt is in an acceptable range.

14. The method according to claim 13, further comprising:
    calculating a third distance between the first static spot and the second static spot based on the coordinates; and
    comparing the third distance with a second predetermined standard distance.

15. The method according to claim 10, wherein N is not less than three.

* * * * *